United States Patent
Goodman et al.

(10) Patent No.: US 9,738,161 B2
(45) Date of Patent: Aug. 22, 2017

(54) VEHICLE-BASED AC HIGH-VOLTAGE ACCESS PREVENTION

(71) Applicant: GM GLOBAL TECHNOLOGY OPERATIONS LLC, Detroit, MI (US)

(72) Inventors: Calvin Goodman, Auburn Hills, MI (US); Keith D. Buford, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 14/619,147

(22) Filed: Feb. 11, 2015

(65) Prior Publication Data
US 2016/0231713 A1 Aug. 11, 2016

(51) Int. Cl.
*B60L 11/18* (2006.01)
*G05B 9/02* (2006.01)
*H02P 27/06* (2006.01)
*B60L 3/04* (2006.01)

(52) U.S. Cl.
CPC ..................................... *B60L 3/04* (2013.01)

(58) Field of Classification Search
None
See application file for complete search history.

(56) References Cited

U.S. PATENT DOCUMENTS

| | | | | |
|---|---|---|---|---|
| 2009/0118078 A1* | 5/2009 | Wilmanowicz | ........ | B60K 6/365 477/3 |
| 2012/0283921 A1* | 11/2012 | Wilmanowicz | ........ | B60K 6/365 701/54 |
| 2013/0116869 A1* | 5/2013 | Liu | ........ | B60W 10/11 701/22 |
| 2015/0292616 A1* | 10/2015 | Monajemi | ............ | F16H 61/061 701/55 |

* cited by examiner

*Primary Examiner* — Jared Fureman
*Assistant Examiner* — Aqeel Bukhari
(74) *Attorney, Agent, or Firm* — Quinn IP Law

(57) ABSTRACT

A vehicle includes a transmission, hood, DC energy storage system, power inverter module, high-voltage AC device, sensors, and a controller. The sensors are operable for determining input signals and conditions, including a position sensor operable for detecting an open/closed position of the hood. The controller is programmed to execute a method for preventing access or exposure to the AC-side of the high-voltage system in an ignition-on state, to receive the input signals and conditions, and to selectively prevent access to the AC-side via a corresponding control action using the received input signals and conditions. The input signals and conditions include the open/closed position of the hood, a PRNDL position, and a powertrain mode of the vehicle.

14 Claims, 3 Drawing Sheets

| IGN | PRNDL | $S_{18}$ | PM | CAR |
|---|---|---|---|---|
| + | P/N | X | R | F |
| | P/N | X | A/S | F |
| | P/N | O→X | R | F |
| | D/L | - | - | F |
| | - | - | O | HV + ; AC = DSBL |
| | P/N | O | R | (12) = SD; AC = DSBL; → A/S |
| | P/N | O | A/S | AC = DSBL; A/S→ |
| | P/N | X→O | A/S | AC = DSBL; A/S→$LIM_{SOC}$ |
| ↓ | P/N | X→O | R | 12 = A/S; AC = DSBL; A/S→$LIM_{SOC}$ |
| - | - | - | - | HV = DSBL |

FIG. 2

VEHICLE-BASED AC HIGH-VOLTAGE ACCESS PREVENTION

TECHNICAL FIELD

The present disclosure relates to the automatic prevention of access to alternating current (AC) high-voltage power aboard a high-voltage propelled vehicle.

BACKGROUND

Separate high-voltage alternating current (AC) and direct current (DC) power circuits are available aboard a high-voltage propelled vehicle in order to provide the necessary electrical power for propelling the vehicle and operating various power electronic components. Example high-voltage components include one or more polyphase electric motor/generator units, a power inverter module, and an auxiliary power module. Within a given one of these components, the high-voltage electrical connection is typically made by fastening a standard electrical cable to the component and a high-voltage bus bar.

High-voltage interlock (HVIL) circuits are conventionally used to help prevent a user accessing or being exposed to high-voltage electricity in a high-voltage propelled vehicle. An HVIL circuit is a low-voltage circuit that is energized via a 12-15 VDC auxiliary battery, and which selectively disconnects or disables the high-voltage power supply when an access attempt is made with respect to the component. The HVIL circuit is commonly routed to a connection box or splicing junction of the high-voltage component. The HVIL circuit senses a potential access attempt by detecting a change in certain electrical characteristics of any low-voltage wires or lines forming the HVIL circuit. However, the use of HVIL circuits can be less than optimal, for instance in terms of the required amount of additional wiring, component count, and packaging complexity.

SUMMARY

A vehicle is disclosed herein that includes a controller programmed as set forth herein to address some of the limitations of conventional HVIL-based methods for mitigating the effects of a high-voltage access attempt. The present approach foregoes the use of an HVIL circuit on the AC-side of a high-voltage system in favor of specific sensor-based control logic as disclosed herein. In an exemplary embodiment, the vehicle includes a transmission, a hood, a high-voltage DC energy storage system (ESS), a power inverter module (PIM), a high-voltage AC device that is electrically connected to the PIM via a high-voltage AC bus on an AC-side of the high-voltage system, a plurality of sensors, and a controller.

The sensors, which are collectively operable for determining input signals and conditions, include a hood position sensor operable for detecting an open/closed position of the hood. The ESS stores high-voltage DC power via a DC side on a high-voltage system. The PIM is electrically connected to the ESS via a high-voltage DC bus on the DC side of the high-voltage system. The high-voltage AC device, e.g., a motor/generator unit (MGU), is electrically connected to the PIM via a high-voltage AC bus on the AC-side of the high-voltage system.

The controller has a processor and memory on which is recorded instructions for protecting against a user's attempted access to the AC-side of the high-voltage system in an ignition-on state, doing so via a set of mitigation logic as set forth herein. The controller is programmed to receive the input signals and conditions from the sensors, and to selectively prevent access to the AC-side, i.e., to protect against accidental exposure to the AC-side, via execution of an appropriate powertrain control action using the received input signals and conditions. The input signals and conditions include the open/closed position of the hood, the park/reverse/neutral/drive/low (PRNDL) state of the transmission, and a propulsion system mode. The particular control action executed via the controller depends on the values and timing of the combination of these input signals and conditions as set forth herein.

The controller may be programmed in this embodiment to enable or command full operating functionality of the vehicle as one of the control actions whenever the hood is closed and the ignition state is on. The controller may temporarily disable an AC switching function of the PIM as part of the control action when the hood is open unless overridden via a predetermined override signal, such as a threshold throttle level and/or duration or a separate override signal from an input device.

The vehicle may include an engine. In such a case, the controller may be programmed to selectively shut down the engine as part of the control action, e.g., absent an override signal, when the hood is open and the engine is running The controller may automatically stall the vehicle as part of the control action when the ESS attains a threshold low state of charge when the hood is open and the propulsion mode is an engine auto-stop mode.

A method for preventing or protecting against access to an AC-side of a high-voltage system in a vehicle includes detecting a set of input signals and conditions, including detecting an open/closed position of the hood via a hood position sensor, a PRNDL position of the transmission, and a propulsion mode of the vehicle. The method also includes executing a corresponding control action using the received input signals and conditions to selectively prevent access to the AC-side of the high-voltage system.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a data table describing a set of input signals and conditions, as well as the corresponding control results that maybe taken aboard the vehicle of FIG. 1.

DETAILED DESCRIPTION

Figure 1:
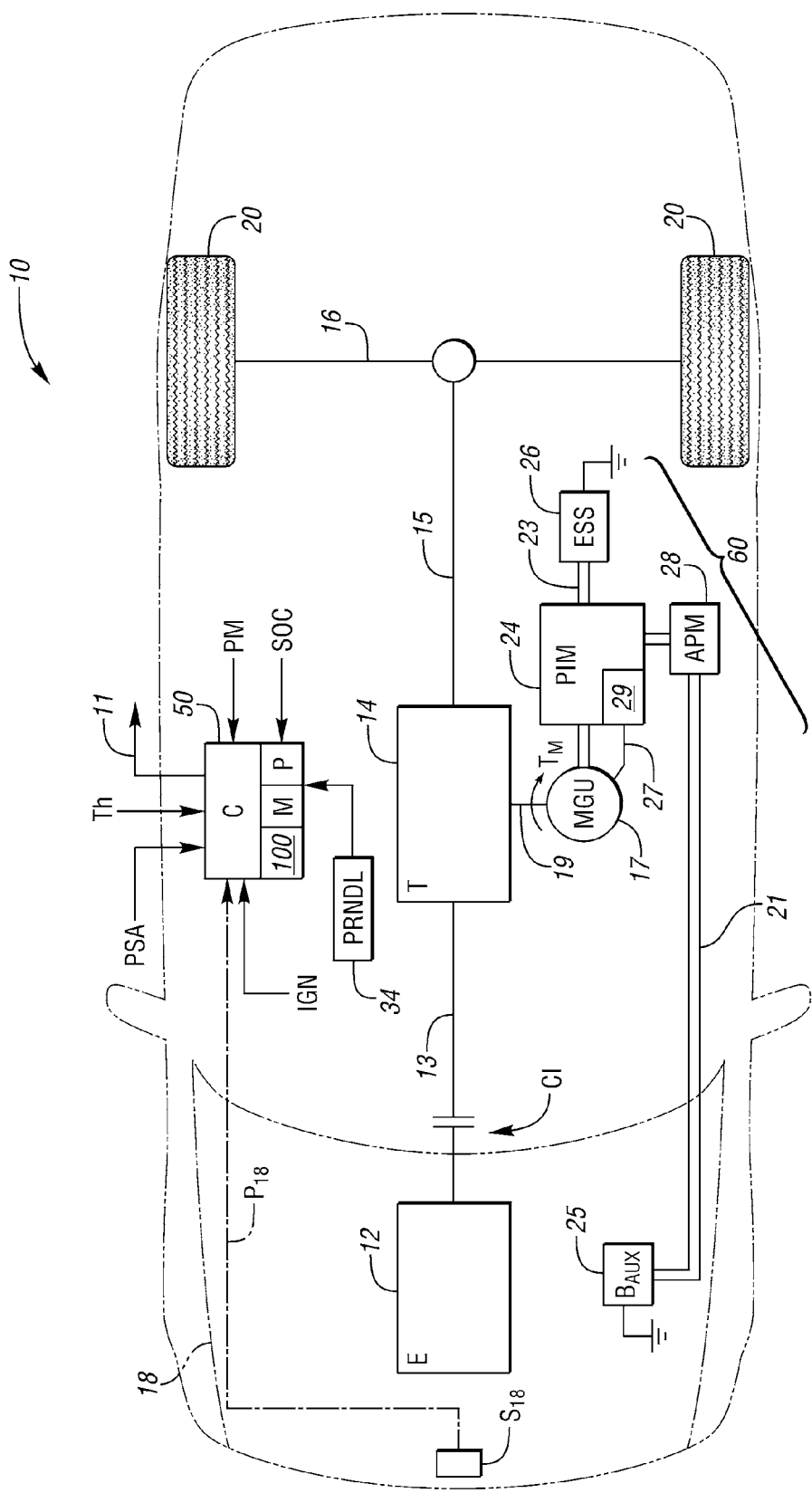
FIG. 1 is a schematic illustration of a vehicle having a dual AC/DC high-voltage system and a controller programmed to detect and prevent access or exposure to the high-voltage system via mitigation logic as disclosed herein.

Referring to the drawings, wherein like reference numbers refer to like components, and beginning with FIG. 1, an example vehicle 10 is shown in FIG. 1. The vehicle 10 is configured as a high-voltage propelled vehicle, e.g., a strong hybrid-electric vehicle as shown, a fuel cell vehicle, a battery electric vehicle, an extended-range electric vehicle, or any other vehicle that in one or more powertrain modes is powered via polyphase or alternating current (AC) high-voltage power. As used herein, the term "high voltage" refers to voltage levels in excess of the typical 12-15 V auxiliary voltage levels used for powering wiper motors, entertainment systems, lighting systems, and the like. Typical high-voltage levels aboard a vehicle such as the vehicle 10 of FIG. 1 may range from 60-300 VAC or more depending on the embodiment.

Figure 3:
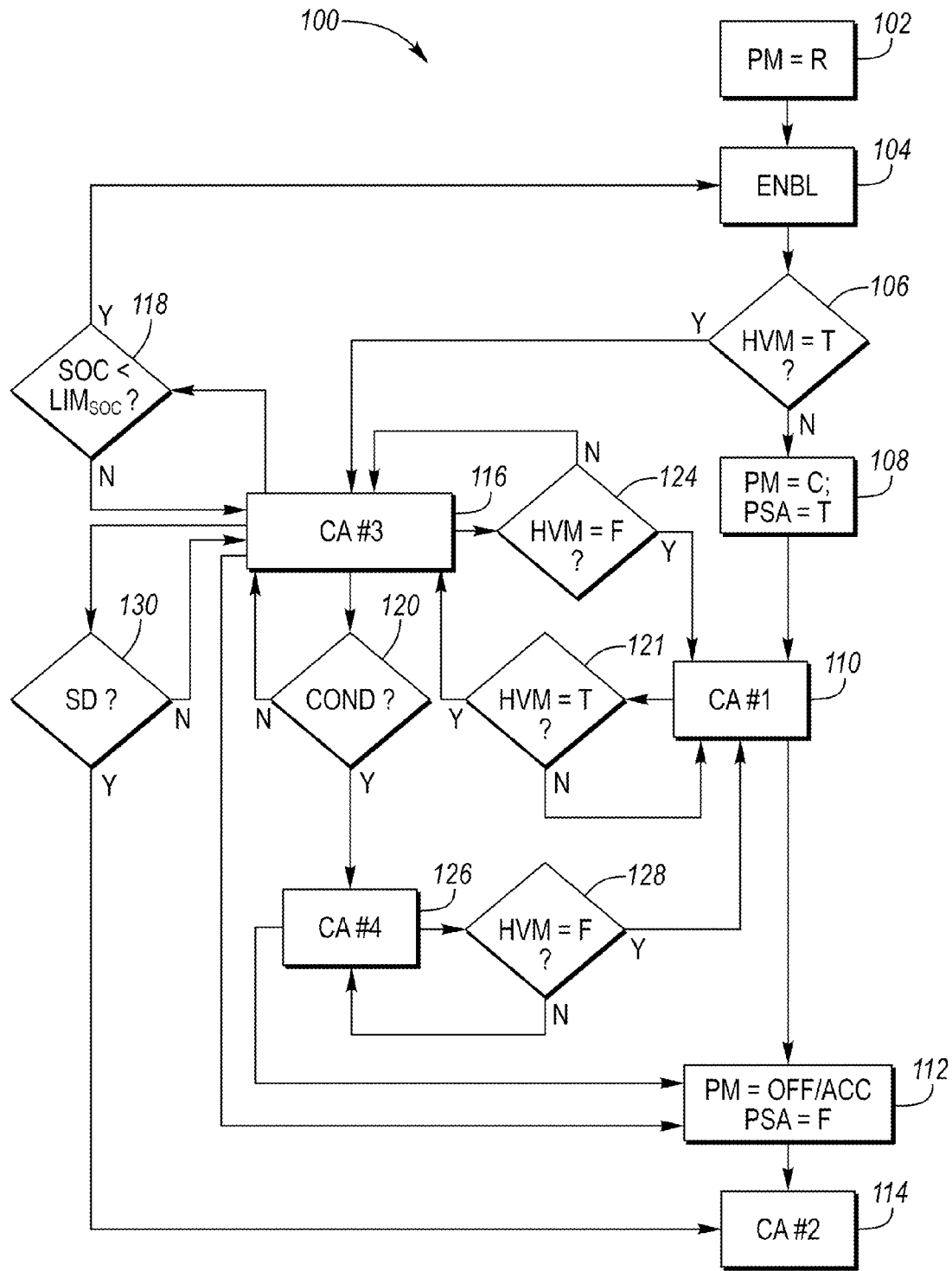
FIG. 3 is a flow chart describing a method for preventing access or exposure to the high-voltage system shown in FIG. 1.

The vehicle 10 includes a controller (C) 50. The controller 50 is programmed to execute mitigation logic embodying a method 100, an example of which is shown in FIG. 3, so as to automatically prevent access or exposure to high-voltage AC power aboard the vehicle 10. The present design foregoes the use of a high-voltage interlock (HVIL) circuit on an AC side of a high-voltage system 60, with AC and DC denoted on a power inverter module (PIM) 24 to designate the two sides of the high-voltage system 60. While omitted from FIG. 1 for illustrative simplicity, an HVIL circuit may be retained on the DC side of the high-voltage system 60. For the AC side, the controller 50 monitors various input signals and conditions and executes a selected one of a plurality of different possible control actions depending on these values. A data table is shown in FIG. 2, which along with the flow chart of FIG. 3 describes the method 100 and its intended application.

The example vehicle 10 of FIG. 1 may include an internal combustion engine (E) 12 and a transmission (T) 14. An input member 13 of the transmission 14 can be selectively connected to the engine 12 via an input device CI such as a clutch, a clutch and damper assembly, or a hydrodynamic torque converter. The transmission 14 may include one or more gear sets, friction clutches, and fluid control components (not shown) suitable for transmitting engine torque to an output member 15 of the transmission 14, and ultimately to one or more drive axles 16 and drive wheels 20 to thereby propel the vehicle 10. Depending on the particular design of the vehicle 10, the open/closed state of the input device CI may be controlled via the controller 50 or another control module to selectively disconnect the engine 12 from the transmission 14 as needed, such as to allow propulsion to occur solely via motor torque (arrow $T_M$) delivered to a rotor shaft 19 from an electric motor/generator (MGU) 17.

Regardless of the powertrain configuration, high-voltage electrical energy is supplied to various devices via the high-voltage system 60. Such devices can include, without being limited to, the PIM 24 having a set of semiconductor switches 29, the MGU 17, an electrical energy storage system (ESS) 26, an auxiliary power module (APM) 28, and possibly other high-voltage devices. Of these, the MGU 17 is powered on the AC-side of the high-voltage system 60 via a high-speed power switching operation of the PIM 24. That is, the semiconductor switches 29 are switched on and off via pulse width modulation to convert DC power from the ESS 26 to AC power suitable for energizing the phase windings of the MGU 17, as is well known in the art. Selective prevention or disabling of such AC power switching is one of the possible control actions within the scope of the method 100 as explained below with reference to FIGS. 2 and 3.

For storage and supply of high-voltage electrical energy, the ESS 26 is electrically connected to the PIM 24 via a high-voltage DC bus 23. As will be understood by those of ordinary skill in the art, the high-voltage DC bus 23 contains high-voltage cables enclosed within a suitable semi-flexible dielectric insulating coating, connector bars, and the like. The PIM 24 is electrically connected to the MGU 17 via a polyphase AC bus 27, and thus is able to transmit converted power from the ESS 26 to the MGU 17 and any other connected AC high-voltage components or devices.

The ESS 26 may include one or more rechargeable battery packs, e.g., nickel cadmium, lithium ion, or other suitable rechargeable battery device, and associated power electronics, although other electrical and/or electrochemical devices having the ability to alternately store and deliver high-voltage electrical power to devices onboard the vehicle 10 as needed may also be used. The ESS 26 can be sized based on the required functionality, including any regenerative braking or electric propulsion requirements. The ESS 26 may be selectively disconnected via high-voltage contactors K1, K2, e.g., to discharge voltage in response to vehicle shutdown as is known in the art.

The APM 28 is operable for converting DC voltage from the ESS 26 to a lower auxiliary power level sufficient for maintaining an auxiliary battery ($B_{AUX}$) 25 at a threshold charge level and/or to drive any auxiliary loads aboard the vehicle 10. The auxiliary battery 25 may be embodied as a conventional 12-15 VDC lead acid battery, a low-voltage capacitance device, or the like. A low-voltage DC bus 21 may be used to electrically connect the APM 28 to the auxiliary battery 25 as shown.

With respect to the controller 50 shown in FIG. 1, this device may be configured as one or more digital computers having hardware elements such as the memory (M), a processor (P), and circuitry including but not limited to a timer, oscillator, analog-to-digital circuitry, digital-to-analog circuitry, proportional-integral-derivative control logic, and any necessary input/output devices and other signal conditioning and/or buffer circuitry. The memory (M) may include tangible, non-transitory memory such as read only memory, e.g., magnetic, solid-state/flash, and/or optical memory, as well as sufficient amounts of random access memory, electrically-erasable programmable read-only memory, and the like. Steps embodying the method 100 may be recorded in memory (M) and executed by the processor (P) in the overall control of high-voltage access aboard the vehicle 10.

As part of the method 100, the controller 50 receives various input signals and conditions and executes one of a plurality of different control actions depending on these values. The input signals and conditions include a hood position signal (arrow $P_{18}$) from a hood position sensor $S_{18}$, which may be embodied as any mechanical, electromechanical, electrical, or virtual sensor operable for determining an open/closed state of a hood 18 of the vehicle 10, with the outline of the hood 18 shown schematically in FIG. 1. In the context of the method 100, the open/closed state of the hood 18 is a binary value, i.e., the hood 18 when unlatched is considered to be open regardless of the degree to which the hood 18 has actually opened, and only a fully-closed and properly latched hood 18 is considered to be closed.

The controller 50 also receives an ignition state (arrow IGN), a throttle level (arrow Th), a PRNDL position (PRNDL), a powertrain mode (arrow PM), and a state of charge (arrow SOC) of the ESS 26. The ignition state (arrow IGN) refers to the on/off state of the ignition of the vehicle 10, which as known in the art may be determined with reference to an ignition key position or an ignition push-button state, both of which are known logic states aboard the vehicle 10. The throttle level (arrow Th) refers to the amount of force/travel applied to an accelerator pedal (not shown) or another suitable throttle input device, while the PRNDL position (PRNDL) describes the present park (P), reverse (R), neutral (N), drive (D), or low gear (L) position of a PRNDL lever 34 of the transmission 14. As is known in the art, moving a PRNDL lever 34 commands a PRNDL valve (not shown) to a corresponding position, and thus the position of the PRNDL lever 34 is likewise a known logic state aboard the vehicle 10.

Additional input signals and conditions include the propulsion mode (arrow PM), which reflects a binary state of enablement of the propulsion system of the vehicle 10, i.e., whether or not propulsion is enabled and thus possible to command, regardless of whether such propulsion is in fact actually commanded. In other words, when the propulsion mode is enabled, the vehicle 10 is capable of propulsion whenever a driver commands sufficient throttle (arrow Th), whether via the engine 12, the MGU 17, or both. The state of charge (arrow SOC) of the ESS 26 may be continuously or periodically calculated or estimated and monitored via suitable battery logic (not shown) as part of the typical battery control functionality aboard the vehicle 10, for instance using measured current, voltage, ambient temperature, and the like.

In response to the input signals and conditions, the controller 50 of FIG. 1 executes the steps of the method 100 and selects, as a result of the method 100, between different possible control actions with respect to the high-voltage system 60. As will now be described with reference to FIG. 2, these control actions range from enabling full or unrestricted functionality of the high-voltage system 60 to the temporary disabling of functions of the high-voltage system 60, as well as to various options in between such as disabling the AC switching function of the PIM 24 via PWM control of the semiconductor switches 29.

Such control steps may be commanded via a set of control signals (arrow 11) generated by the controller 50 over a controller area network (CAN) bus or other suitable communication channels, and transmitted from the controller 50 either directly to the affected devices or components or to an associated control module (not shown), for instance an engine control module, a hybrid control module, a battery control module, or the like. The controller 50 is also programmed to execute an override mode in response to an override signal when the hood 18 is in an opened position, with the override mode enabling the engine 12 to continue running, with this additional programmed feature described forth below.

FIG. 2 depicts the various programmed control actions that can be commanded by the controller 50 in response to the input signals and conditions noted above, i.e., the ignition state (IGN), the PRNDL position, the hood position signal ($P_{18}$), and the propulsion mode (PM) describing whether propulsion is enabled. Such enablement may be indicated to all logic controllers, including the controller 50, via a propulsion system active (PSA) flag as explained below.

When the ignition is turned off, a state which is indicated in FIG. 2 by the "−" symbol in the ignition (IGN) column, the controller 50 automatically disables the AC and DC-sides of the high-voltage system 60 of FIG. 1 in any existing manner, such as by opening the high-voltage contactors and discharging to threshold charge levels as is known in the art. The states of the other control signals and conditions are not considered in this determination, as indicated by the use of the "−" symbol in the PRNDL, $P_{18}$, and PM columns. In this state, regardless of whether the hood 18 is open or closed, the engine 12 remains off and no AC switching is permitted via the semiconductor switches 29 of the PIM 24. As a result, propulsion via the MGU 17 is temporarily disabled.

In the remaining states the ignition is on (+). That is, a driver has turned a key in the ignition or pressed an ignition button. In such a state, the driver would expect propulsion to be available when throttle is requested, and therefore such a mode may be considered a "propulsion capable" mode. The controller 50, however, selectively executes logic embodying the method 100 to enter a mitigation state with respect to high-voltage power on the AC-side of the high-voltage system 60. In FIG. 2, the state "P/N" in the PRNDL column refers to the PRNDL lever 34 of FIG. 1 being shifted to the park or neutral positions, respectively. In the position signal ($P_{18}$) column, the symbol "X" refers to a fully closed hood 18, the symbol "O" refers to an open or unlatched hood 18, and the "O→X" refers to a transition in which the hood 18 starts out in the open state and is closed in the process of executing the method 100. In the propulsion mode (PM) column, the symbol "R" refers to "running", "A/S" to auto-stop, "O" to off/propulsion system disabled, and "-" to either auto-stop or running.

As is known in the art, the term "auto-stop" refers to a commanded shut down of the engine 12, typically at idle to minimize idle fuel consumption, with the propulsion mode remaining propulsion capable. Throttle request coupled with removal of pressure from a brake pedal (no shown) is usually sufficient to transition to a forward drive mode. By way of contrast, the vehicle 10 is not propulsion capable when the ignition is turned off or when operating in a stall mode of the type described below.

In the control actions (CA) column of FIG. 2 the symbol "F" designates full operating capabilities are enabled. In other words, there are no restrictions placed by way of the method 100 on the operation of the vehicle 10. Other designations include "HV +", which means the AC-side of the high-voltage system 60 is energized, "AC=DSBL" meaning that AC switching via the semiconductor switches 29 of PIM 24 is disabled, "(12)=SD" indicating that shut-down of the engine 12 is commanded, "→A/S" indicates a commanded transition to an auto-stop mode, and "A/S→$LIM_{SOC}$" refers to remaining in the auto-stop mode until a calibrated state of charge limit ($LIM_{SOC}$) is reached of the ESS 26 before commanding a stall of the vehicle 10.

With respect to the latter control action of stalling the vehicle 10, this action effectively transitions the vehicle 10 from a propulsion-capable mode to one in which propulsion is not available unless and until the driver affirmatively requests it via another ignition-on cycle. In other words, if a driver requests throttle by depressing an accelerator pedal after a stall is commanded and achieved, propulsion will not result. Stalling as a control action as used herein is intended to prevent the stranding of the vehicle 10, for instance if a driver is parked with the hood 18 open and the high-voltage system 60 running various accessories, the state of charge of the ESS 26 will gradually decrease to a level below which cranking and starting, when it is eventually requested, will not possible. By preemptively commanding a stall of the vehicle 10, the controller 50 helps to ensure that the state of charge of the ESS 26 does not decrease below such a limit. The various states described shown in FIG. 2 can be selectively entered by operation of the controller 50 according to the example logic flow of the method 100 shown in FIG. 3.

Referring to FIG. 3, the method 100 begins at step 102 wherein the controller 50 of FIG. 1 determines that the propulsion mode (PM) has transitioned to a run (R) state. Step 102 may entail determining the ignition state to determine if the run mode is presently requested and not otherwise prevented by any other logic operating aboard the vehicle 10. The method 100 proceeds to step 104, wherein high-voltage AC mitigation logic of the controller 50 is enabled (ENBL) and thus available for use depending on the various control signals and conditions.

Upon enabling the mitigation logic at step 104, the controller 50 next determines at step 106 whether such high-voltage mitigation is commanded "true", as abbreviated "HVM=T" in FIG. 3. Step 106 includes processing the hood position signal (arrow $P_{18}$) and determining from such processing that the hood 18 is closed. Step 106 also entails determining that the vehicle 10 is moving, e.g., via a speed sensor (not shown) connected to the output member 15 or a drive wheel 20 of FIG. 1, and that the PRNDL lever 34 of FIG. 1 is set to park or neutral. If all of these conditions are true, the method 100 proceeds to step 116. Otherwise the method 100 proceeds to step 108.

Step 108 includes setting the propulsion mode to crank, i.e., "PM=C", and setting a corresponding propulsion state active (PSA) flag to true, as abbreviated by "PSA=T". The method 100 then proceeds to step 110.

At step 110, the controller 50 next executes a first control action (CA #1). Step 110 includes enabling full operation of the vehicle 10, which corresponds with the control action denoted by "F" in FIG. 2. When the hood 18 is closed, the vehicle 10 is moving or not in park or neutral, the control action of step 110 does not override AC switching within the PIM 24, active discharge, or any forced control of the engine 12. The method 100 then proceeds to steps 112 and 121.

At step 112, the controller 50 transitions the power mode to off/accessory power only, i.e., "PM=OFF/ACC". The PSA flag noted above with reference to step 106 is set to false, indicating that the propulsion system is not commanded active. Such a state may result when a driver turns the ignition off, which would ultimately result in the high-voltage contactors K1, K2 of FIG. 1 opening as part of any existing voltage discharge process. The method 100 then proceeds to step 114.

Step 114 includes executing a second control action (CA #2). Step 114 is similar to step 110 and the first control action (CA #2) in all respects, other than that high-voltage mitigation logic is disabled in step 114 and remains enabled in step 112. The method 100 is complete after execution of step 114, with full powertrain functionality restored, and the vehicle 10 operates without restrictions with respect to its high-voltage system 60.

At step 116, the controller 50 executes a third control action (CA #3) upon determining at step 106 that high-voltage mitigation is commanded true, i.e., that the hood 18 is open, the vehicle 10 is moving, and the PRNDL lever 34 of FIG. 1 is set to park or neutral. Step 116 entails commanding the engine 12 to shut down, e.g., via a request to an engine control module (not shown), the disabling of AC switching via control of the PIM 24, and disabling active discharge of the high-voltage system 60. The method 100 then proceeds to steps 120 and 130.

Step 118 includes determining the state of charge (SOC) of the ESS 26 of FIG. 1 is at or below a calibrated limit, i.e., SOC<$LIM_{SOC}$ as abbreviated in FIG. 3. The method 100 proceeds to step 104 when the state of charge of the ESS 26 is at or below the calibrated limit. Otherwise, the method 100 proceeds to step 116.

Step 120 entails determining, via the controller 50, whether a set of predetermined mitigation override conditions are present that would enable an operator of the vehicle 10 to escape the mitigation logic regardless of the present states that placed the controller 50 into mitigation logic. For instance, in certain maintenance situations a driver or maintenance person might wish to leave the hood 18 open to more closely monitor the engine 12 or other components. To ensure that the mitigation logic does not shut off the engine 12 while this is occurring, the controller 50 may receive an override signal, e.g., the throttle (arrow Th) signal or a separate signal from a navigation system, monitor the PRNDL lever 34 to determine if the PRNDL lever 34 has transitioned to park or neutral, and determine that the propulsion system active (PSA) flag remains true. If so, the method 100 proceeds to step 126 and thereby escapes mitigation. Otherwise, step 116 is repeated and no override functionality is provided.

Step 121 includes determining if the underhood high-voltage mitigation logic flag is commanded true, i.e., HVM=T in FIG. 3. This step is analogous to step 106 described above. If true, the method 100 proceeds to step 116. The method 100 proceeds to step 110 in the alternative.

Step 124 includes evaluating a set of exit conditions to determine if high-voltage mitigation is commanded false, i.e., HVM=F. The conditions evaluated at this step include the hood 18 being closed and the PRNDL lever 34 being set to park or neutral, and also a threshold throttle level when the transmission 14 is shifted out of park or neutral. If this is the case, the method 100 proceeds to step 110. Otherwise, the method 100 repeats step 116.

Step 126 entails executing a fourth control action (CA4). In this instance, the controller 50 turns or allows the engine 12 to turn on, allows active high-voltage discharge to occur as needed in its ordinary scheme via control of the contactors K1, K2 of FIG. 1, and does not override AC switching of the PIM 34. The method 100 proceeds to step 128.

At step 128 the controller 50 determines if the high-voltage mitigation flag is commanded false, i.e., HVM=F. This step is analogous to step 124 described above. The method 100 proceeds to step 110 when the mitigation flag is false, where the first control action is executed. The method 100 otherwise repeats step 126.

At step 130, which may be arrived at from step 116, the controller 50 next determines whether an emergency shut down (SD) has been requested. This condition may be commanded via logic due to any number of powertrain conditions. An emergency shutdown as used herein is any rapid shutdown of the vehicle 10, and specifically the high voltage system 60, such that the high voltage contactors K1, K2 are automatically opened. Conditions such as removing a manual service disconnect, e.g., via action of a DC HVIL circuit (not shown) or an impact between the vehicle 10 and an object, can result in generation of an emergency shutdown request. The method 100 proceeds to step 114 where the second control action (CA #2) is executed in the manner described above.

Using the above method 100, the controller 50 of FIG. 1 is able to execute a mitigation state of high-voltage access control logic in which protection is afforded from exposure to certain conditions aboard the vehicle 10, including rotating components of the engine 12, arc flash, and electrical access to the high-voltage system 60. AC switching via the PIM 24 of FIG. 1 can be temporarily disabled to prevent high-voltage propulsion via the MGU 17, and active discharge can be temporarily suspended. In some conditions the engine 12 of FIG. 1 may be forced off, which may be of value in certain maintenance modes where the presence of rotating components is not desired.

The method 100 also checks for low states of charge of the ESS 26 so as to prevent stranding. Use of the hood switch $S_{18}$ of FIG. 1 in conjunction with the mitigation logic described above, and in particular the override logic step 120 of FIG. 3, allows for selective access to the engine 12 or other underhood components when the engine 12 is running by allowing the driver or maintenance person to request continued operation/exit from the mitigation logic when so desired. As a result, a multi-layer sensor-based strategy is enabled for controlling high-voltage access aboard the vehicle 10 of FIG. 1 or other vehicles having a high-voltage propulsion system of the type described hereinabove.

While the best modes for carrying out the present disclosure have been described in detail, those familiar with the art to which this disclosure relates will recognize various alternative designs and embodiments that fall within the scope of the appended claims.

The invention claimed is:

1. A vehicle comprising:
a transmission having a park, reverse, neutral, drive, low (PRNDL) lever;
a hood having an opened/closed position;
a high-voltage system having a DC-side and an AC-side foregoing use of a high-voltage interlock (HVIL) circuit, and including:
an energy storage system (ESS) configured to store and supply high-voltage direct current (DC) power to the DC-side of the high-voltage system;
a power inverter module (PIM) that is electrically connected to the ESS on the DC-side of the high-voltage system; and
a high-voltage alternating current (AC) device that is electrically connected to the PIM on the AC-side of the high-voltage system;
a hood position sensor operable for detecting an open/closed position of the hood; and
a controller programmed to:
receive a set of input signals and conditions, including the open/closed position of the hood, a position of the PRNDL lever, and a powertrain mode of the vehicle; and
selectively prevent access or exposure to the AC-side of the high-voltage system via execution of a corresponding control action using the received input signals and conditions, including temporarily disabling a power switching function of the PIM when the hood is in the opened position.

2. The vehicle of claim 1, wherein the high-voltage AC device is a polyphase motor/generator unit.

3. The vehicle of claim 1, wherein the controller is programmed to enable full operating functionality of the vehicle when the hood is in the closed position.

4. The vehicle of claim 1, further comprising an engine, wherein the controller is programmed to selectively shut down the engine as part of the control action when the hood is in the opened position and the engine is running.

5. The vehicle of claim 1, wherein the controller is programmed to automatically stall the vehicle as part of the control action when the ESS attains a threshold low state of charge, the hood is in the opened position, and the propulsion mode is an auto-stop mode.

6. The vehicle of claim 5, further comprising an engine, wherein the controller is programmed to receive an override signal when the hood is in the opened position, and to enable the engine to continue running in response to the received override signal.

7. A method for preventing access to an alternating current (AC)-side of a high-voltage system foregoing use of a high-voltage interlock (HVIL) circuit and having the AC-side and a DC-side in a vehicle having the high-voltage system, a polyphase motor/generator unit, a transmission connected to the polyphase motor/generator unit, and a hood, the high-voltage system including a power inverter module (PIM) that is electrically connected between the polyphase motor/generator unit on the AC-side and an energy storage system (ESS) on the DC-side, the method comprising:
detecting a set of input signals and conditions, including detecting an open/closed position of the hood via a hood position sensor, a park, reverse, neutral, drive, and low (PRNDL) position of the transmission, and a propulsion mode of the vehicle; and
executing a corresponding control action using the detected input signals and conditions to thereby selectively prevent access or exposure to the AC-side of the high-voltage system, including temporarily disabling an AC power switching function of the PIM when the hood is in the opened position.

8. The method of claim 7, further comprising enabling full operating functionality of the vehicle when the hood is in the closed position.

9. The method of claim 7, wherein the vehicle includes an engine, and wherein executing a corresponding control action includes selectively shutting down the engine when the hood is in the opened position and the engine is running.

10. The method of claim 9, the method further comprising:
executing an override mode in response to an override signal that enables the engine to continue running when the hood is in the opened position.

11. The method of claim 7, wherein executing a corresponding control action includes automatically stalling the vehicle when the ESS attains a threshold low state of charge, the hood is in the opened position open, and the propulsion mode is an auto-stop mode.

12. A method for preventing access to an alternating current (AC)-side of a high-voltage system having the AC-side and a DC-side in a vehicle foregoing use of a high-voltage interlock (HVIL) circuit and having the high-voltage system, an engine, a transmission, and a hood, wherein the high-voltage system includes a power inverter module (PIM) that is electrically connected to an energy storage system (ESS) on the DC-side of the high-voltage system, the method comprising:
receiving a set of input signals and conditions, including an open/closed position of the hood, a park, reverse, neutral, drive, and low (PRNDL) position of the transmission, and a propulsion mode of the vehicle; and
executing a corresponding control action aboard the vehicle using the received set of input signals and conditions to selectively prevent access or exposure to the AC-side of the high-voltage system, including:
temporarily disabling an AC power switching operation of the PIM to the motor/generator unit when the hood is in the opened position;
enabling full operating functionality of the vehicle when the hood is in the closed position; and
selectively shutting down the engine when the hood is in the opened position and the engine is running.

13. The method of claim 12, wherein receiving a set of input signals and conditions includes receiving a state of charge of the ESS, and wherein executing a corresponding control action includes automatically stalling the vehicle when the state of charge is less than a threshold low state of charge, the hood is in the opened position open, and the propulsion mode is an auto-stop mode.

14. The method of claim 12, the method further comprising:

executing an override mode in response to an override signal that enables the engine to continue running when the hood is in the opened position.

\* \* \* \* \*